US008811323B2

(12) United States Patent
Kim et al.

(10) Patent No.: US 8,811,323 B2
(45) Date of Patent: Aug. 19, 2014

(54) APPARATUS AND METHOD FOR DISCONTINUOUS DATA RECEPTION IN WIRELESS COMMUNICATION SYSTEM

(75) Inventors: Soeng-Hun Kim, Gyeonggi-do (KR); Gert-Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 13/509,569

(22) PCT Filed: Nov. 10, 2010

(86) PCT No.: PCT/KR2010/007917
§ 371 (c)(1),
(2), (4) Date: May 11, 2012

(87) PCT Pub. No.: WO2011/059229
PCT Pub. Date: May 19, 2011

(65) Prior Publication Data
US 2012/0314637 A1    Dec. 13, 2012

(30) Foreign Application Priority Data

Nov. 11, 2009    (KR) ......................... 10-2009-0108512
Mar. 17, 2010    (KR) ......................... 10-2010-0023897
May 11, 2010    (KR) ......................... 10-2010-0044145

(51) Int. Cl.
*H04W 4/00*    (2009.01)
(52) U.S. Cl.
USPC ........................................ 370/329; 455/422.1
(58) Field of Classification Search
None
See application file for complete search history.

(56) References Cited

U.S. PATENT DOCUMENTS

| 2008/0085680 A1 | 4/2008 | Kim et al. | |
| 2008/0212541 A1* | 9/2008 | Vayanos et al. | 370/335 |
| 2009/0147726 A1* | 6/2009 | Tseng | 370/315 |
| 2009/0239566 A1* | 9/2009 | Pelletier et al. | 455/517 |
| 2009/0296643 A1* | 12/2009 | Cave et al. | 370/329 |

(Continued)

FOREIGN PATENT DOCUMENTS

| KR | 10-0755269 | 9/2007 |
| KR | 10-2008-0026012 | 3/2008 |
| WO | WO 2004/068801 A1 | 8/2004 |

OTHER PUBLICATIONS

International Search Report dated Jun. 24, 2011 in connection with International Patent Application No. PCT/KR2010/007917.

(Continued)

*Primary Examiner* — Anh-Vu Ly
*Assistant Examiner* — Gustavo Lopez-Vargas

(57) ABSTRACT

Disclosed in a method of discontinuous data reception in a mobile communication system. The method includes: receiving downlink data and decoding the received downlink data by the UE; when the decoding is not successful, starting a timer for receiving retransmitted data; when the downlink data has been received by a configured downlink assignment, operating a downlink carrier, through which the downlink data has been received, in an active time; and when the downlink data has been received by a dynamic transmission resource and the downlink carrier, through which the downlink data has been received, is different from a downlink carrier, through which a scheduling command for the downlink data has been received, operating the downlink carrier, through which the scheduling command for the downlink data has been received, and the downlink carrier, through which the downlink data has been received, in an active time.

14 Claims, 15 Drawing Sheets

(56) References Cited

U.S. PATENT DOCUMENTS

| | | | |
|---|---|---|---|
| 2009/0316638 A1* | 12/2009 | Yi et al. | 370/329 |
| 2010/0246520 A1* | 9/2010 | Andersson | 370/329 |
| 2011/0044261 A1* | 2/2011 | Cai et al. | 370/329 |
| 2011/0268003 A1* | 11/2011 | Li et al. | 370/311 |
| 2011/0294491 A1* | 12/2011 | Fong et al. | 455/422.1 |
| 2011/0300857 A1* | 12/2011 | Kazmi et al. | 455/423 |
| 2012/0014306 A1* | 1/2012 | Pelletier et al. | 370/311 |
| 2012/0051306 A1* | 3/2012 | Chung et al. | 370/329 |
| 2012/0057490 A1* | 3/2012 | Park et al. | 370/252 |
| 2012/0300733 A1* | 11/2012 | Pelletier et al. | 370/329 |

OTHER PUBLICATIONS

Written Opinion of International Searching Authority dated Jun. 24, 2011 in connection with International Patent Application No. PCT/KR2010/007919.

* cited by examiner

[Fig. 14]

APPARATUS AND METHOD FOR DISCONTINUOUS DATA RECEPTION IN WIRELESS COMMUNICATION SYSTEM

TECHNICAL FIELD

The present invention relates to a method and an apparatus for discontinuous data reception by a User Equipment (UE), in which multiple downlink carriers and uplink carriers are aggregated, in a mobile communication system.

BACKGROUND ART

In general, mobile communication systems have been developed in order to provide a communication while securing the mobility of users. With the rapid technical development, the mobile communication systems have reached a stage at which they can provide a high speed data communication service as well as a voice communication service.

Recently, standardization for the Long Term Evolution (LTE), which is one of next generation mobile communication systems, is in progress in the 3rd Generation Partnership Project (3GPP). The LTE is targeting at its commercialization in the year of around 2010 and is a technology for achieving a high speed packet-based communication having a maximum of 100 Mbps data rate higher than the current data rate, and the standardization of the LTE has been nearly completed. In order to keep pace with the standardization of the LTE, an LTE-Advanced (LTE-A) communication system for further improving the data rate by grafting various new technologies onto the LTE communication system is now in serious discussion. Representative technologies to be newly introduced into the LTE include the Carrier Aggregation (CA) technology. Differently from the prior art in which one UE uses one downlink carrier and one uplink carrier, the carrier aggregation technology allows a UE to use multiple downlink carriers and multiple uplink carriers.

DISCLOSURE OF INVENTION

Technical Problem

However, it is unclear how to perform a discontinuous data reception when one UE uses multiple downlink carriers and multiple uplink carriers as described above.

Solution to Problem

Accordingly, the present invention has been made to solve the above-mentioned problems occurring in the prior art, and the present invention provides a method and an apparatus for discontinuous data reception by a User Equipment (UE) when the UE performs a communication by using multiple downlink carriers and uplink carriers in a mobile communication system including the multiple downlink carriers and uplink carriers.

In accordance with an aspect of the present invention, there is provided a method of discontinuous data reception by a User Equipment (UE), in which multiple carriers are aggregated, in a mobile communication system, the method including the steps of: receiving downlink data and decoding the received downlink data by the UE; when the decoding is not successful, starting a timer for receiving retransmitted data; when the downlink data has been received by a configured downlink assignment, operating a downlink carrier, through which the downlink data has been received, in an active time and waiting until next downlink data is received; and when the downlink data has been received by a dynamic transmission resource and the downlink carrier, through which the downlink data has been received, is different from a downlink carrier, through which a scheduling command for the downlink data has been received, operating the downlink carrier, through which the scheduling command for the downlink data has been received, in an active time and waiting until next downlink data is received.

In accordance with another aspect of the present invention, there is provided a method of transmitting uplink data by a User Equipment (UE) performing discontinuous data reception, in which multiple carriers are aggregated, in a mobile communication system, the method including the steps of: transmitting uplink data by the UE; when transmission of the uplink data is transmission by a configured uplink grant, monitoring a control channel signal received through a downlink carrier having a feedback association with an uplink carrier, through which the uplink data has been transmitted; when transmission of the uplink data is transmission by reception of an uplink grant indicating an uplink transmission, monitoring a control channel signal received through a downlink carrier, through which the uplink grant has been transmitted; and performing uplink data retransmission according to the control channel signal.

In accordance with another aspect of the present invention, there is provided a User Equipment (UE) apparatus, in which multiple carriers are aggregated, for discontinuous data reception in a mobile communication system, the UE apparatus including: a transmission/reception unit for receiving downlink data and downlink control channel signals through multiple downlink carriers, and transmitting uplink data and uplink control channel signals through multiple uplink carriers; a transmission/reception control unit for controlling the transmission/reception unit to cause the transmission/reception unit to transmit the uplink data or receive the downlink data according to a control signal input from the transmission/reception unit; a discontinuous reception control unit for operating a time for data transmission/reception, determining a downlink carrier to be operated in an active time among multiple downlink carriers according to information on a scheduling command input from the transmission/reception control unit, and controlling the transmission/reception unit based on the determination; and a multiplexing/demultiplexing unit for multiplexing data generated in a higher layer device or demultiplexing data received in the transmission/reception unit and transferring the demultiplexed data to the higher layer device.

Advantageous Effects of Invention

Now, effects of the present invention will be briefly described.

According to the present invention, when multiple downlink carriers and multiple uplink carriers have been aggregated in a UE, it is possible to monitor only a predetermined PDCCH instead of monitoring PDCCHs of all the aggregated downlink carriers even when the UE operates in an active time. Therefore, the present invention can minimize the power consumption of the UE.

BRIEF DESCRIPTION OF DRAWINGS

The above and other aspects, features and advantages of the present invention will be more apparent from the following detailed description taken in conjunction with the accompanying drawings, in which.

MODE FOR THE INVENTION

Hereinafter, exemplary embodiments of the present invention will be described with reference to the accompanying drawings. In the following description, various specific definitions found in the following description are provided only to help general understanding of the present invention, and it is apparent to those skilled in the art that the present invention can be implemented without such definitions.

The present invention proposes a method and an apparatus for discontinuous reception in a UE in which multiple carriers are aggregated.

Before a detailed description of the present invention, a Long Term Evolution (LTE) mobile communication system will be described in more detail with reference to FIGS. 1, 2, and 3.

Figure 1:
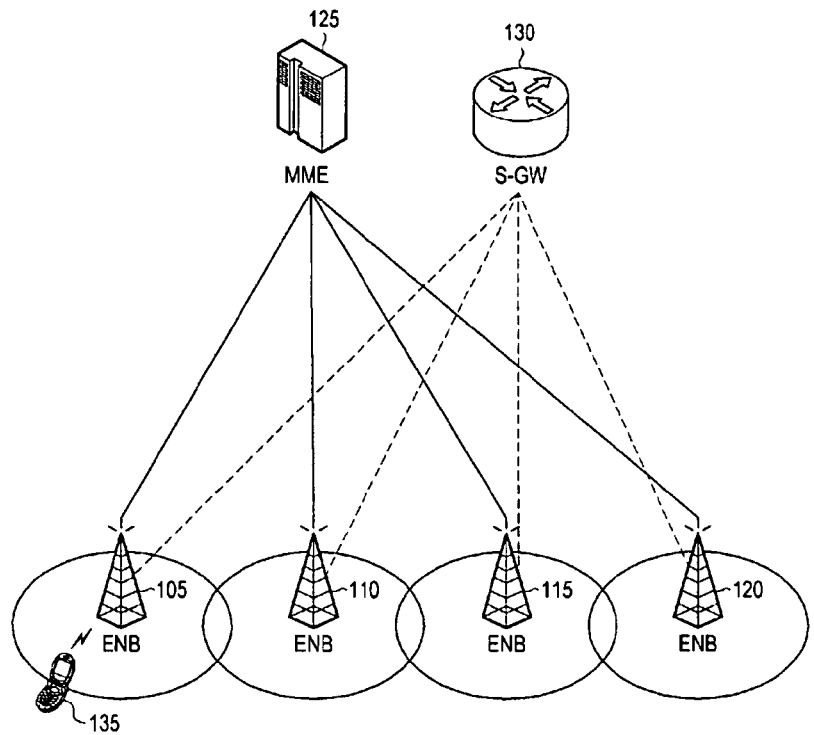
FIG. 1 illustrates a structure of a typical Long Term Evolution (LTE) mobile communication system.

FIG. 1 illustrates a structure of a typical Long Term Evolution (LTE) mobile communication system.

Referring to FIG. 1, a wireless access network of the shown LTE mobile communication system includes Evolved Node Bs (ENBs or Node Bs) 105, UE 110, 115, and 120, a Mobility Management Entity (MME) 125, and a Serving-Gateway (S-GW) 130. A User Equipment (UE) MME/SGSN 135 accesses an outer network through the ENBs 105, UE 110, 115, and 120 and the S-GW 130.

Each of the ENBs 105 to 120 corresponds to an existing Node B of the UMTS system. The ENBs 105 to 120 are connected with the UE MME/SGSN 135 through a wireless channel and perform more complicated functions than the existing Node B. In the LTE system, since all user traffics, including a real time service such as a Voice over Internet Protocol (VoIP) service provided using an Internet protocol, are provided through a shared channel, an apparatus for collecting situations of UEs and performing a scheduling is required and such a function is performed by the ENBs 105 to 120. In general, one ENB controls multiple cells. In order to implement a data rate of a maximum of 100 Mbps, the LTE uses the Orthogonal Frequency Division Multiplexing (OFDM) scheme as a wireless access technology in a maximum of 20 MHz bandwidth. Further, the LTE employs an Adaptive Modulation and Coding (AMC) scheme, which determines a modulation scheme and channel coding rate according to the channel state of a UE. The S-GW 130 is an apparatus for providing a data bearer and generates or removes the data bearer under the control of the MME 125. The MME 125 is an apparatus for performing various control functions related to the mobility and is connected to multiple ENBs.

Figure 2:
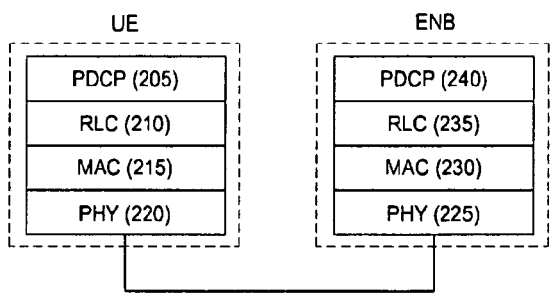
FIG. 2 illustrates a wireless protocol structure of a typical LTE system.

FIG. 2 illustrates a wireless protocol structure of a typical LTE system.

As shown in FIG. 2, a wireless protocol of a typical LTE system includes a Packet Data Convergence Protocol (PDCP) layer 205 or 240, a Radio Link Control (RLC) layer 210 or 235, a Medium Access Control (MAC) layer 215 or 230, and a Physical (PHY) layer 220 or 225. The PDCK layer 205 or 240 performs IP header compression and restoration, and the RLC layer 210 or 235 reconstructs a PDCP Packet Data Unit (PDU) to a proper size and performs an Automatic Repeat reQuest (ARQ) operation. The MAC layer 215 or 230 is connected to multiple RLC layer entities included in one UE, multiplexes RLC PDUs into a MAC PDU, and demultiplexer a MAC PDU into multiple RLC PDUs. The PHY layer 220 or 225 channel codes or modulates higher layer data into an OFDM symbol and then transmits the OFDM symbol, or demodulates an OFDM symbol received through a wireless channel, channel-decodes the demodulated symbol, and then transfers the channel-decoded data to a higher layer. Based on the transmission, data input to a protocol entity is called a Service Data Unit (SDU) and data output from the protocol entity is called a Protocol Data Unit (PDU).

Figure 3:
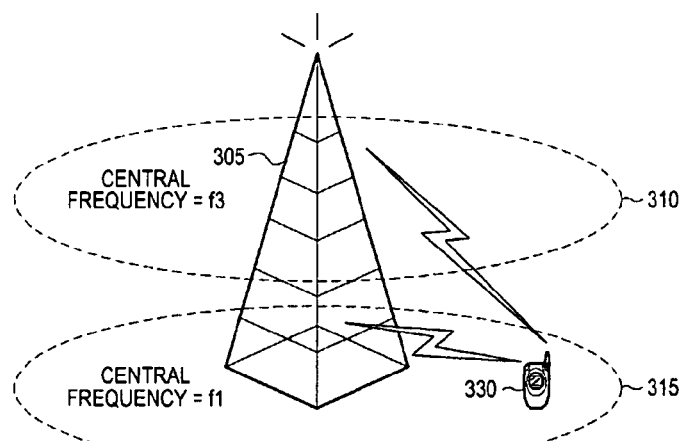
FIG. 3 illustrates an example of carrier aggregation in a typical LTE mobile communication system.

FIG. 3 illustrates an example of carrier aggregation in a typical LTE mobile communication system.

Referring to FIG. 3, in general, one ENB transmits and receives a plurality of carriers through multiple frequency bands. For example, when an ENB 305 transmits a carrier 315 having a central frequency of f1 and a carrier 310 having a central frequency of f2, one UE transmits and receives data by using one carrier from among the two carriers. However, a UE having a carrier aggregation capability can simultaneously transmit and receive data through a plurality of carriers. Therefore, the ENB can allocate more carriers to the UE having a carrier aggregation capability, in order to enhance the transmission speed of the UE. In an environment in which one cell includes one downlink carrier and one uplink carrier in the conventional sense, the carrier aggregation can be understood as a simultaneous transmission and reception of data through multiple cells by a UE. In the carrier aggregation, the maximum transmission speed increases in proportion to the number of aggregated carriers.

In the following description of the present invention, reception of data through a downlink carrier or transmission of data through an uplink carrier by a UE refers to transmission or reception of data by the UE using a data channel and a control channel provided by a cell corresponding to a central frequency and frequency band characterizing the carriers. Further, in the present invention, aggregation of carriers, and setting, establishment, or activation of carriers for a UE implies a state in which the UE can transmit and receive data through the carriers. Therefore, the terms of aggregation, setting, establishment, and activation of carriers are mixedly used herein for convenience of description.

Before description of the present invention, a discontinuous reception operation of an LTE mobile communication system will be briefly described.

Figure 4:
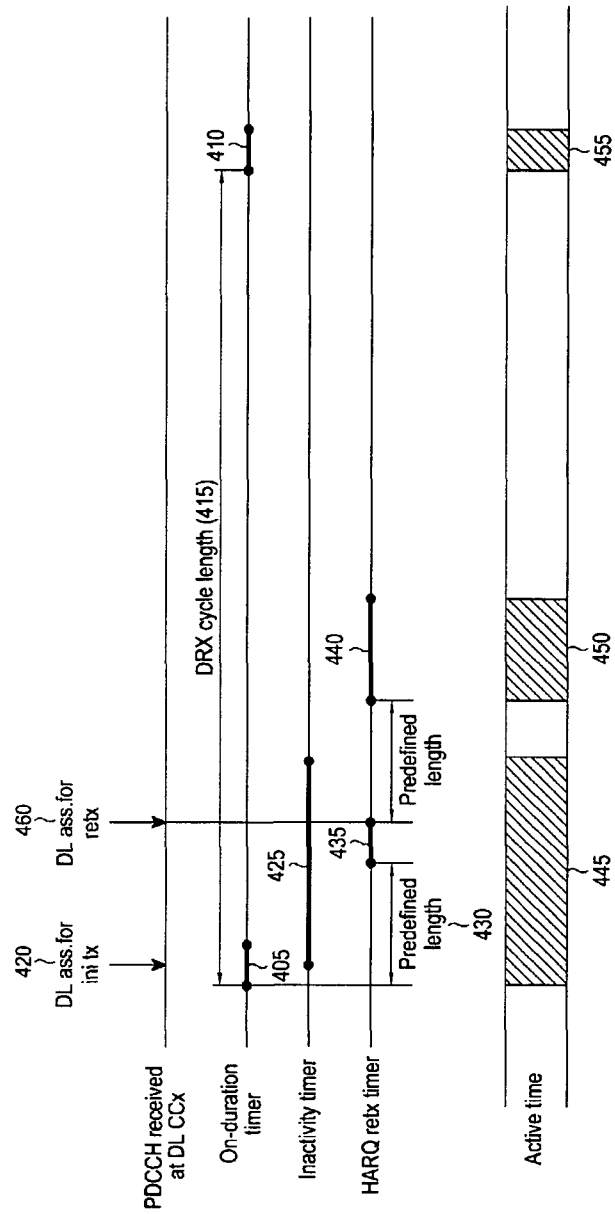
FIG. 4 illustrates an example of a discontinuous reception operation of an LTE mobile communication system.

FIG. 4 illustrates an example of a discontinuous reception operation of an LTE mobile communication system.

The discontinuous reception operation corresponds to an operation in which a UE periodically turns on a receiver at predetermined time points to determine whether to perform a scheduling, thereby minimizing the power consumption of the UE. The operation in which a UE periodically turns on a receiver to determine whether to perform a scheduling is also expressed as "the UE is in an active time", which implies that the UE is monitoring a downlink control channel. A downlink control channel is called a Physical Downlink Control Channel (PDCCH), through which a downlink scheduling command, which is for allocating a downlink transmission resource and contains control information necessary for reception of downlink data, or an uplink scheduling command, which is for allocating an uplink transmission resource and contains control information necessary for transmission of uplink data, is transmitted. In the standards, the downlink scheduling command is called a downlink assignment and the uplink scheduling command is called an uplink grant. In the following description of the present invention, reception of a downlink scheduling command or an uplink scheduling command by a UE is identical to reception of a downlink assignment or an uplink grant by the UE, which is also expressed as reception of a PDCCH by the UE.

The downlink scheduling command or the uplink scheduling command is divided into a command for Hybrid Automatic Repeat reQuest (HARQ) initial transmission and a command for HARQ retransmission. In the following description, a downlink or an uplink scheduling command for HARQ initial transmission is referred to as a downlink or an uplink initial transmission scheduling command, and a downlink or an uplink scheduling command for HARQ retransmission is referred to as a downlink or an uplink retransmission scheduling command.

The discontinuous reception operation is specified by defining the time point when a UE shifts to an active time and monitors a PDCCH and the time point when a UE shifts to a non-active time, stops monitoring the PDCCH, and turns off the receiver.

As shown in FIG. 4, the UE includes an on-duration timer, an inactivity timer, and an HARQ retransmission timer, and operates in an active time if at least one timer among the timers operates.

The on-duration timer operates during a predetermined time interval 405 or 410 at every Discontinuous Reception (DRx) cycle 415. The inactivity timer operates whenever the UE receives a scheduling command indicating an initial transmission. For example, when a downlink scheduling command indicating an initial transmission is received (420) while the on-duration timer is operating, the inactivity timer is operated (425). While the inactivity timer is operated, even when a downlink scheduling command indicating an initial transmission is received, the inactivity timer does not operate again.

Since a downlink data reception and an uplink data transmission are performed according to an HARQ scheme, the UE should receive a scheduling command for HARQ retransmission when an error remains in the data. To this end, the HARQ retransmission timer is defined. Whenever receiving downlink data, the HARQ retransmission timer is operated (435 or 440) after the passage of a predefined time interval 430 at the time point when the downlink data is received. Upon receiving a scheduling command indicating retransmission (460), the HARQ retransmission timer is stopped.

As discussed above, if at least one timer among the three timers is in operation, the UE operates in an active time (445, 450, or 455).

However, when multiple downlink carriers and multiple uplink carriers are aggregated in a UE, it may cause excessive power consumption more than the amount necessary to monitor PDCCHs of all the aggregated downlink carriers even though the UE operates in an active time. Therefore, the present invention presents a DRX apparatus and a DRX operation of a UE for minimizing the power consumption when multiple downlink carriers and multiple uplink carriers are aggregated in a UE.

The present invention proposes minimization of power consumption through monitoring of only PDCCHs of predetermined downlink carriers, instead of monitoring all PDCCHs of the downlink carriers aggregated in a UE when the UE is operated in an active time. In the following description of the present invention, operating a particular downlink carrier in an active time implies that a UE monitors a PDCCH of the downlink carrier to determine whether to perform a scheduling.

The first embodiment of the present invention discusses the downlink carrier, which will be operated in an active time when a UE, in which multiple carriers are aggregated, operates an HARQ retransmission timer. The second embodiment of the present invention discusses the downlink carrier, which will be operated in an active time when a UE, in which multiple carriers are aggregated, should monitor a PDCCH in order to determine whether to perform an adaptive retransmission. The third embodiment of the present invention discusses the downlink carrier, an inactivity timer of which a UE should operate when the UE, in which multiple carriers are aggregated, has received a scheduling command indicating an initial transmission. The fourth embodiment of the present invention discusses a discontinuous reception operation of a UE, in which multiple carriers are aggregated, wherein the UE uses a semi-permanent resource in one of the aggregated carriers.

<1st Embodiment>

In a UE in which multiple carriers are aggregated, one on-duration timer and one inactivity timer may be aggregated or as many on-duration timers and as many inactivity timers as the downlink carriers may be aggregated. However, the first embodiment and the second embodiment of the present invention are based on an assumption that a UE includes one on-duration timer and one inactivity timer since the number of on-duration timers and the number of inactivity timers do not have an influence on the present invention.

Figure 5:
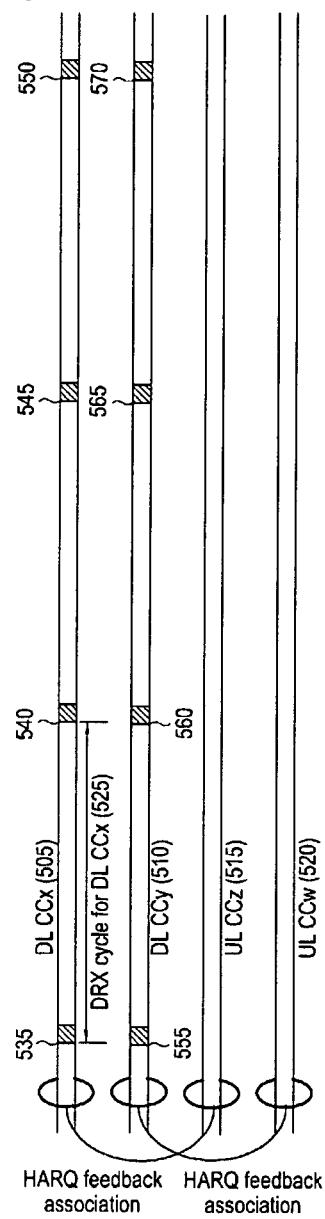
FIG. 5 illustrates an example of an aggregation of multiple downlink carriers and multiple uplink carriers in an LTE communication system.
Figure 6:
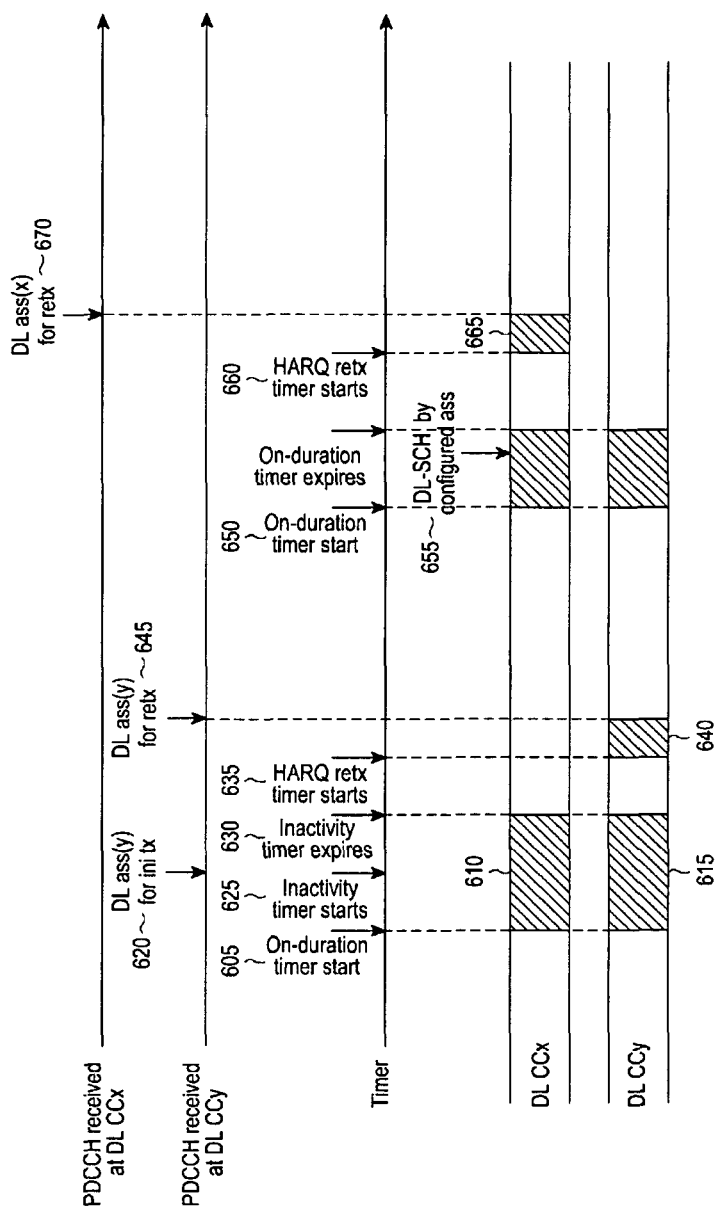
FIG. 6 illustrates an example when a UE operates predetermined downlink carriers in an active time according to the first embodiment of the present invention.

FIG. 5 illustrates an example of an aggregation of multiple downlink carriers and multiple uplink carriers in an LTE communication system, and FIG. 6 illustrates an example when a UE operates predetermined downlink carriers in an active time according to the first embodiment of the present invention.

Referring to FIGS. 5 and 6, two downlink carriers and two uplink carriers are aggregated in one UE, wherein a downlink carrier x (DL CCx) 505 has an HARQ feedback association with an uplink carrier z (UL CCz) 515 and a downlink carrier y (DL CCy) 555 has an HARQ feedback association with an uplink carrier w (UL CCw) 520. An HARQ feedback association established between a downlink carrier and an uplink carrier implies that an uplink HARQ feedback for data received through the downlink carrier is transmitted through the uplink carrier and a downlink HARQ feedback for uplink data transmitted through the uplink carrier is received through the downlink carrier.

The UE operates an on-duration timer at every predetermined time point, and operates all downlink carriers aggregated in the UE during the operation of the on-duration timer. In the embodiment shown in FIG. 5, the UE operates both the downlink carrier x 505 and the downlink carrier y 555 in an active time. That is, the UE monitors PDCCHs of the downlink carrier x 505 and the downlink carrier y 555. In the embodiment shown in FIG. 5, the UE periodically operates the on-duration timer in the intervals 535 to 570, and operates all downlink carriers in an active time during the operation of the on-duration timer. When the UE receives a downlink scheduling command for an initial transmission through one downlink carrier among the aggregated downlink carriers at a certain time point, the UE operates an inactivity timer and extends the active time of the aggregated downlink carriers.

For example, referring to FIG. 6, when the UE receives a downlink scheduling command 620 for an initial downlink transmission of the downlink carrier y from the downlink carrier y before expiration of the operation of the on-duration timer after starting (605) of the on-duration timer, the UE operates an inactivity timer (625). When the operation of the inactivity timer expires at a predetermined time point, the UE cancels the active time. Separately from the operation of the on-duration timer or the inactivity timer, when the UE receives downlink data, the UE decodes the downlink data and transmits an HARQ Acknowledgment (ACK) or HARQ Negative Acknowledgment (NACK) according to a result of the decoding. When the UE has transmitted an HARQ NACK due to failure in successfully receiving the data, the UE operates the HARQ retransmission timer (635) after the passage of a predetermined time interval from the time point of receiving the downlink data, in order to receive retransmitted data. If it is possible to perform the HARQ retransmission through all downlink carriers as well as the downlink carrier through which the initial transmission has been performed, the UE must monitor PDCCHs of all the downlink carriers during the operation of the HARQ retransmission timer. A scheme in which the HARQ retransmission is performed through another downlink carrier may facilitate the load balancing between carriers in some degrees. However, this advantage is not so big. Therefore, according to the first embodiment of the present invention, the HARQ retransmission is limited to be performed always through only a predetermined downlink carrier, and the UE operates only the predetermined downlink carrier in an active time during the operation of the HARQ retransmission timer, thereby minimizing the power consumption of the UE. Also, according to the circumstances, the downlink carrier to be operated in an active time may be changed to enhance the scheduling flexibility.

First, when the HARQ retransmission timer has been started by receiving a PDCCH, that is, when downlink data reception, which has started the operation of the HARQ retransmission timer, has been performed through a transmission resource dynamically allocated through the PDCCH, the UE operates only the downlink carrier, through which the PDCCH has been received, in an active time. That is, when the HARQ retransmission timer is started (635), the UE operates the downlink carrier y (DL CCy), which is a downlink carrier through which a downlink assignment corresponding to reception of downlink data that has started the operation of the HARQ retransmission timer has been received, in an active time (640). In some cases, the downlink data that has started the operation of the HARQ retransmission timer may be received without a PDCCH. For example, when a semi-permanent transmission resource has been allocated, the UE receives downlink data through a predetermined transmission resource at a predetermined time point even without receiving a PDCCH. When the HARQ retransmission timer has been started by the downlink data received through a configured transmission resource (in the following description of the present invention, each of a semi-permanent transmission resource, a configured downlink assignment, and a configured uplink grant refers to a transmission resource having a periodicity allocated in advance to the UE, and those terms are mixedly used), the UE operates only the downlink carrier, through which the downlink data has been received, in an active time.

For example, when the UE receives downlink data by a downlink assignment configured through a downlink carrier x (DL CCx) at a predetermined time point (655), the UE decodes the received data. When the decoding of the received data is not successful, the UE starts the HARQ retransmission timer (660) after the passage of a predetermined time interval from the time point at which the downlink data is received. Since the downlink data having caused the starting of the HARQ retransmission timer has been received without a PDCCH, the UE operates the downlink carrier x (DL CCx), through which the downlink data has been received, in an active time (665). Since the configured downlink assignment or configured uplink grant is always configured in a Primary Cell (PCell) or a Primary Component Carrier (PCC), the downlink carrier x is always a PCC. The ENB transmits a PDCCH for retransmission of the downlink data through the downlink carrier x (670). When the UE has received the PDCCH for retransmission of the downlink data, the UE stops the operation of the HARQ retransmission timer and terminates the active time of the downlink carrier x (DL CCx).

Figure 7:
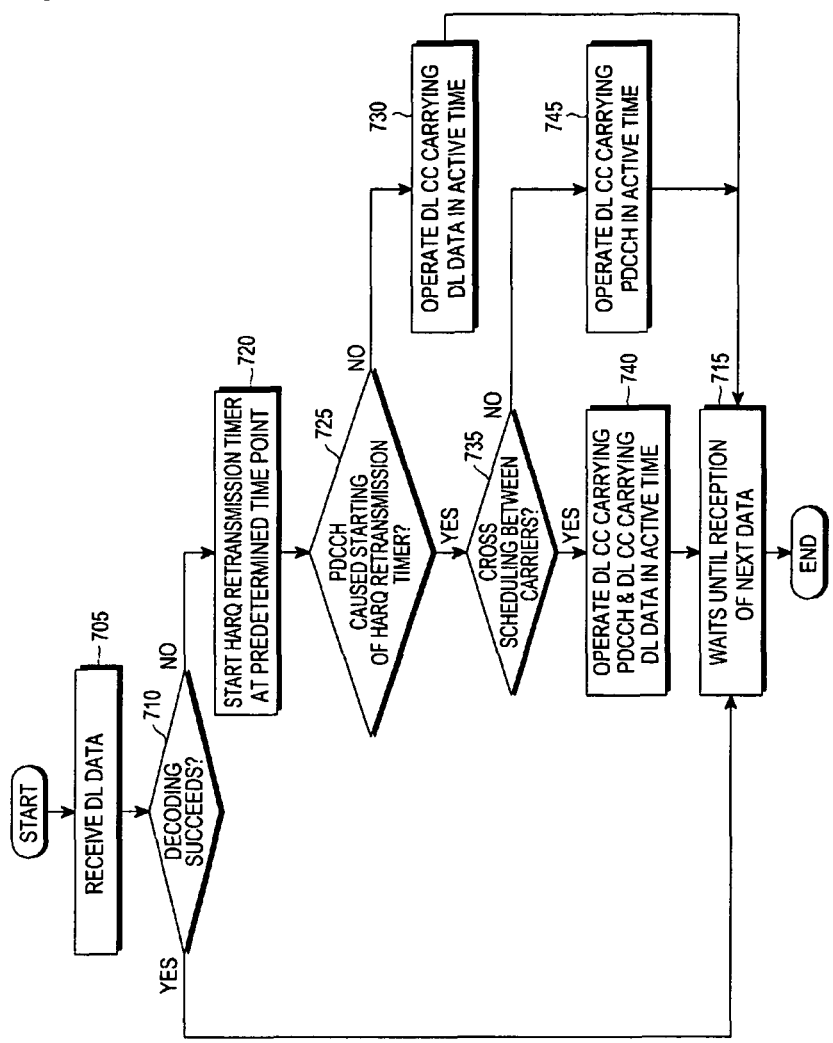
FIGS. 7 and 8 are flowcharts illustrating an operation of a UE according to the first embodiment of the present invention.
Figure 8:
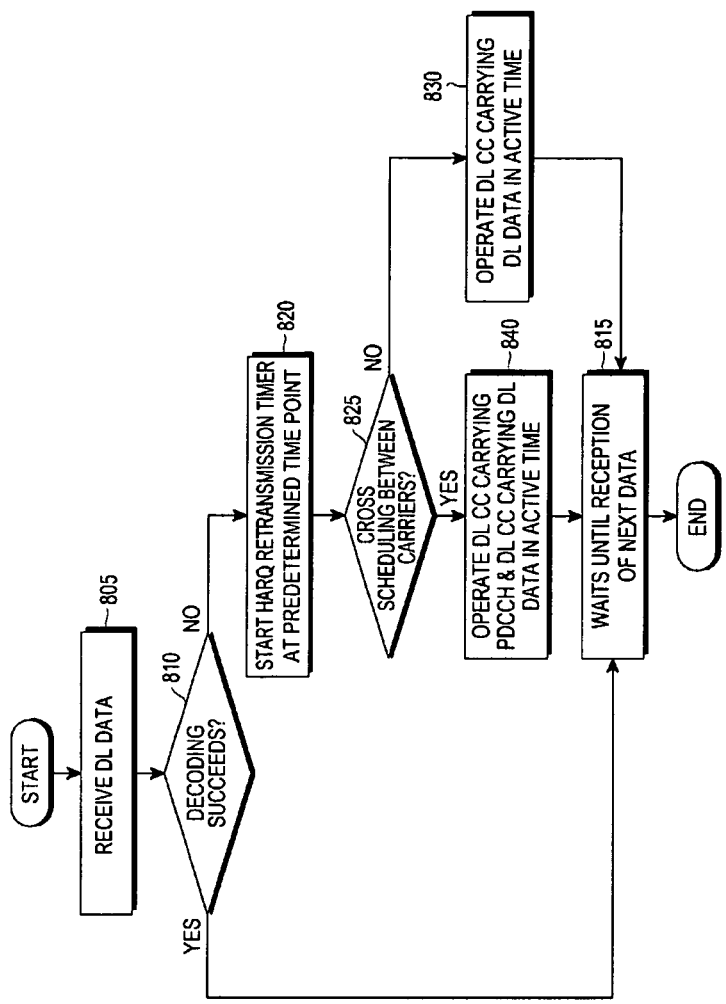

FIGS. 7 and 8 are flowcharts illustrating an operation of a UE according to the first embodiment of the present invention.

Referring to FIG. 7, in step 705, the UE receives downlink data and decodes the received downlink data. Then, in step 710, the UE determines if the decoding of the data is successful. When the decoding of the data is successful, the UE proceeds to step 715, in which the UE waits until next downlink data is received. When the decoding of the data is not successful, the UE proceeds to step 720 in order to receive HARQ retransmission data. In step 720, the UE starts an HARQ retransmission timer at a time point after the passage of a predetermined time interval from the time point at which the downlink data is received. Further, the UE monitors a PDCCH of a predetermined downlink carrier in order to receive HARQ retransmission data during the operation of the HARQ retransmission timer. Then, the UE proceeds to step 725 in order to determine the downlink carrier, a PDCCH of which the UE will examine. In step 725, the UE determines if the downlink data having caused the operation of the HARQ retransmission timer has been scheduled by a PDCCH or received through a configured assignment. When the downlink data having caused the operation of the HARQ retransmission timer has not been scheduled by a PDCCH, that is, when the downlink data has been received through a configured assignment, the UE proceeds to step 730 and operates the downlink carrier, through which the downlink data has been received, in an active time. That is, the UE determines that the HARQ retransmission command for the data will be received through the downlink carrier, through which the downlink data has been received, and monitors the PDCCH of the downlink carrier during the operation of the HARQ retransmission timer.

In contrast, when the downlink data having caused the operation of the HARQ retransmission timer has been scheduled by a PDCCH, that is, when the downlink data has not been received through a configured assignment and has been received by directly receiving a downlink scheduling command, the UE proceeds to step 735. In step 735, the UE determines if the downlink data has been received through a cross scheduling between carriers. That is, the UE determines if the carrier carrying the PDCCH and the carrier carrying the downlink data are different from each other. When the two carriers are different from each other, that is, when the downlink data has been received through a cross carrier scheduling, the UE proceeds to step 740, in which the UE operates both the carrier carrying the PDCCH and the carrier carrying the downlink data in an active time. This is in order to enhance the scheduling flexibility of an ENB by increasing the number of carriers capable of performing the retransmission scheduling, since the occurrence of a cross carrier scheduling implies that it is highly probable that the PDCCH capacity may be generally insufficient.

Further, when the cross scheduling between carriers occurs, it is also a selectable scheme to operate all downlink carriers in an active time during the operation of the HARQ retransmission timer. Therefore, in the first embodiment of the present invention, step 740 can be modified into a step in which all the downlink carriers are operated in an active time.

Further, since the occurrence of a cross scheduling between carriers implies that it is highly probable that the PDCCH capacity of the downlink carrier carrying the downlink data may be insufficient, step 740 in the first embodiment of the present invention can be modified into a step in which only the carrier carrying the PDCCH is operated in an active time.

In the meantime, as a result of the determination in step 735, when the HARQ retransmission timer has not been operated by the cross scheduling between carriers, the UE proceeds to step 745, in which the UE operates the downlink carrier, through which the PDCCH has been received, in an active time. When the downlink carrier to be operated in an active time has been determined in step 730, 740, or 745, the UE operates the downlink carriers in an active time during the operation of the HARQ retransmission timer, and then proceeds to step 715, in which the UE waits until next downlink data is received.

When downlink data is received through a typical scheduling other than the cross scheduling, the downlink carrier, through which the PDCCH has been received, is the same as the downlink carrier, through which the downlink data has been received. Then, the operation of the first embodiment of the present invention can be simplified into that as shown in FIG. 8.

That is, in step 805, the UE receives downlink data and decodes the received downlink data. Then, in step 810, the UE determines if the decoding of the data is successful. When the decoding of the data is successful, the UE proceeds to step 815, in which the UE waits until next downlink data is received. When the decoding of the data is not successful, the UE proceeds to step 820 in order to receive HARQ retransmission data. In step 820, the UE starts an HARQ retransmission timer at a time point after the passage of a predetermined time interval from the time point at which the downlink data is received. Further, the UE monitors a PDCCH of a predetermined downlink carrier in order to receive HARQ retransmission data during the operation of the HARQ retransmission timer. Then, the UE proceeds to step 825 in order to determine the downlink carrier, a PDCCH of which the UE will examine. In step 825, the UE determines if the downlink data having caused the operation of the HARQ retransmission timer has been received through a cross scheduling between carriers. When the downlink data having caused the operation of the HARQ retransmission timer has been received through a typical scheduling other than a cross scheduling between carriers, or when the downlink data has been received through a configured assignment, the UE proceeds to step 830 and operates the downlink carrier, through which the downlink data has been received, in an active time. Then, the UE proceeds to step 815, in which the UE waits until next downlink data is received. In contrast, when the downlink data having caused the operation of the HARQ retransmission timer has been received through a cross scheduling between carriers, the UE proceeds to step 840. In step 840, the UE operates both the carrier carrying the PDCCH and the carrier carrying the downlink data in an active time. Otherwise, the UE operates only the carrier, through which the PDCCH has been received, in an active time. Then, the UE proceeds to step 815, in which the UE waits until next downlink data is received.

<2nd Embodiment>

In the LTE, an uplink transmission is based on a synchronous HARQ scheme. That is, if retransmission is necessary after an initial HARQ transmission, the retransmission is performed at a time point after the passage of a predetermined time interval from the time point at which the initial transmission has been performed. At this time, an ENB may separately indicate a transmission resource for the retransmission by using a PDCCH. When there is no separate indication of a transmission resource for the retransmission, a UE performs the retransmission by using the previously used transmission resource without change. When there is a separate indication of a transmission resource for the retransmission, a UE performs the retransmission through the indicated transmission resource. The former is called a non-adaptive retransmission, while the latter is called an adaptive retransmission. In order to determine whether to perform an adaptive retransmission, a UE should monitor a PDCCH at a predetermined time point after performing an uplink transmission. That is, after a UE, which is performing a discontinuous reception operation, performs an uplink transmission, the UE should shift to an active time at a predetermined time point in order to determine if there is a command for retransmission of the uplink transmission. When only one downlink carrier and only one uplink carrier are aggregated in a UE, it is clear which downlink carrier should be operated in an active time in order to determine whether to perform an adaptive retransmission. However, when a UE has multiple downlink carriers and multiple uplink carriers, the UE should determine the downlink carrier, which should be operated in an active time, from among the multiple downlink carriers in order to determine whether to perform an adaptive retransmission.

Therefore, according to the second embodiment of the present invention, when an uplink HARQ transmission has been indicated through a PDCCH, a UE operates a downlink carrier, through which the PDCCH has been received, in an active time in order to determine whether to perform an adaptive retransmission. Further, when an uplink HARQ transmission has been started by a configured uplink grant, a UE operates a downlink carrier having an HARQ feedback association with an uplink carrier, through which the uplink transmission has been performed, in an active time in order to determine whether to perform an adaptive retransmission.

Figure 9:
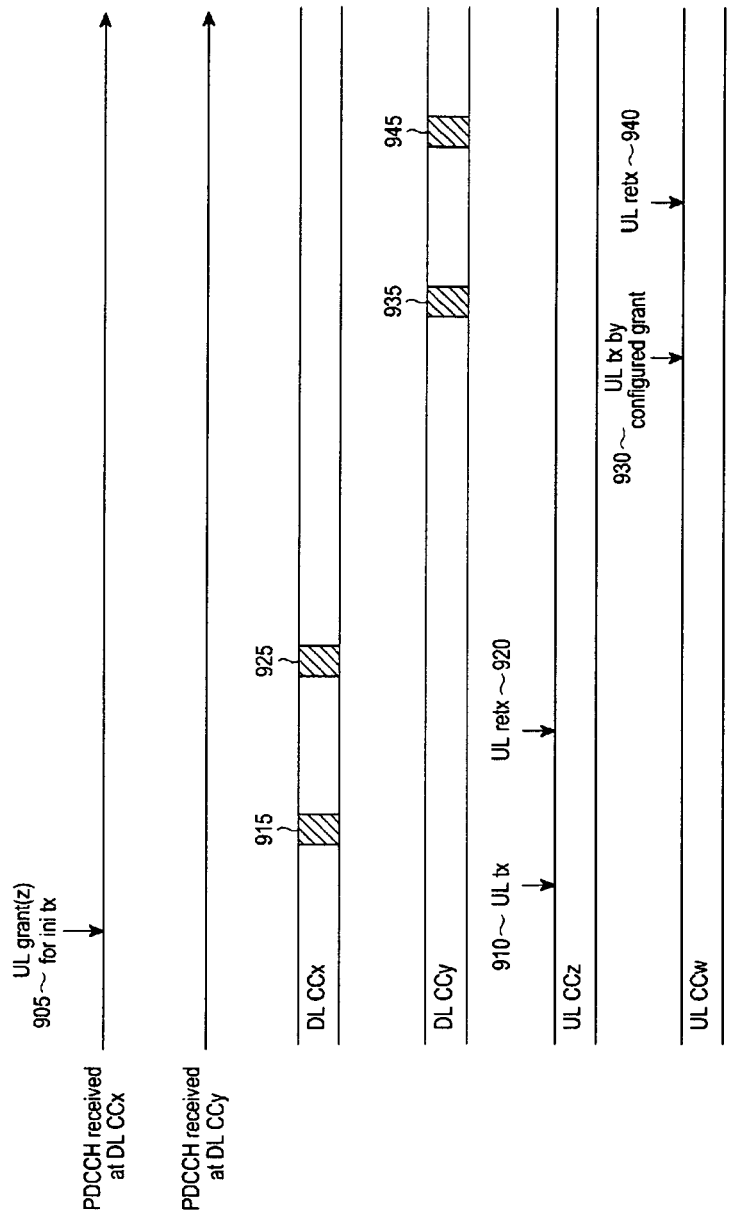
FIG. 9 illustrates an operation according to the second embodiment of the present invention.

FIG. 9 illustrates an operation according to the second embodiment of the present invention.

Referring to FIG. 9, a downlink carrier x (DL CCx) has an HARQ feedback association with an uplink carrier z (UL CCz) and a downlink carrier y (DL CCy) has an HARQ feedback association with an uplink carrier w (UL CCw). When an uplink grant indicating an initial uplink transmission of the uplink carrier z has been received through a PDCCH of the downlink carrier x (905), a UE performs an uplink transmission (910) by using an indicated uplink transmission resource at a time point after the passage of a predetermined time interval from the time point at which the uplink grant is received. Then, in order to determine whether to perform an adaptive retransmission for the uplink transmission, the UE operates the downlink carrier x indicating the uplink transmission in an active time during a predetermined time interval from a predetermined time point (915). Then, the UE performs an uplink retransmission (920) by using an uplink carrier having a feedback association with the downlink carrier, through which the PDCCH has been received, at a predetermined time point. Then, after the retransmission, in order to determine whether to perform an adaptive retransmission, the UE operates the downlink carrier x, through which the PDCCH has been received, in an active time during a predetermined time interval from a predetermined time point (925). The UE repeats the operation until the time point, at which the final retransmission is possible, passes.

Thereafter, an initial transmission using a configured uplink grant is performed through the uplink grant w at a predetermined time point (930). That is, a semi-permanent transmission resource has been allocated to a UE at a predetermined time point, and the UE performs an uplink transmission by using the semi-permanent transmission resource. The UE having performed an uplink transmission by using the semi-permanent transmission resource operates a downlink carrier, through which an HARQ feedback for an uplink carrier performed the uplink transmission will be received, in an active time. This is because the UE should monitor the downlink carrier in order to receive the HARQ feedback. That is, after performing an initial uplink transmission (930) by using a configured uplink grant, the UE operates the downlink carrier (DL CCy), which is a downlink carrier having an HARQ feedback association with the uplink carrier (UL CCw) performed the uplink transmission, that is a downlink carrier through which an HARQ feedback for the uplink transmission is received, in an active time at a predetermined time point (935).

Figure 10:
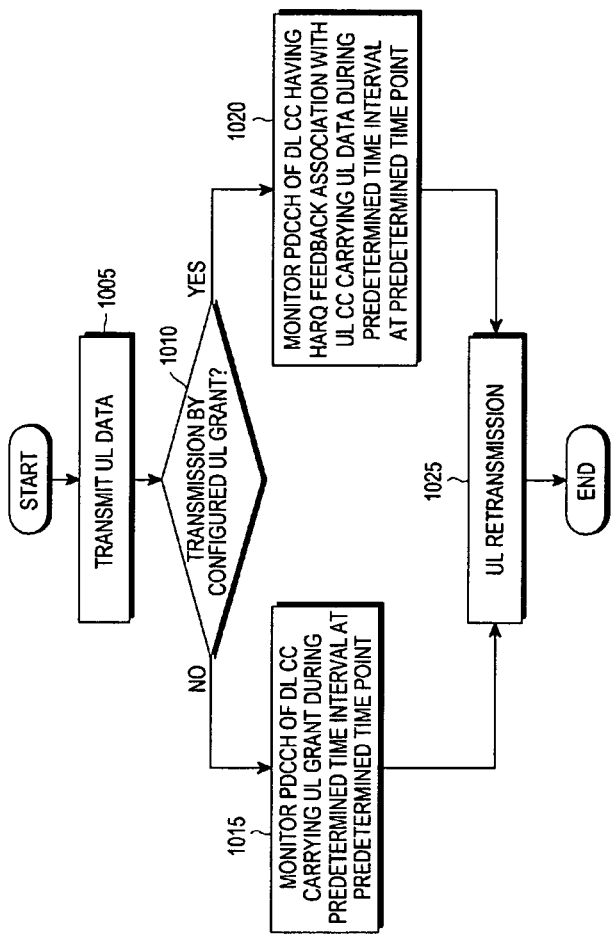
FIGS. 10 and 11 are flowcharts illustrating an operation of a UE according to the second embodiment of the present invention.
Figure 11:
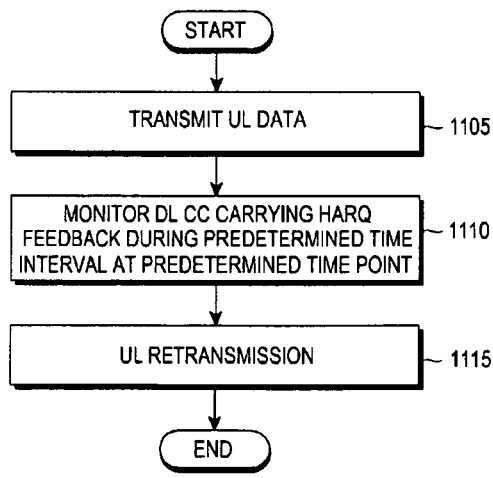

FIGS. 10 and 11 are flowcharts illustrating an operation of a UE according to the second embodiment of the present invention.

Referring to FIG. 10, the UE transmits uplink data in step 1005, and then determines if the uplink data transmission is a transmission by a configured uplink grant in step 1010. When the uplink data transmission is not a transmission by a configured uplink grant, that is, when the uplink data transmission is a transmission performed by receiving an uplink grant indicating an uplink transmission, the UE proceeds to step 1015, in which the UE recognizes that an adaptive retransmission will be indicated through the downlink carrier through which the uplink grant has been received, and monitors a PDCCH of the downlink carrier through which the uplink grant has been received or operates the downlink carrier in an active time during a predetermined time interval at a predetermined time point. The predetermined time point corresponds to a time point after the passage of a certain time interval from the time point at which the uplink data is transmitted. In contrast, as a result of the determination in step 1010, when the uplink data transmission is a transmission by a configured uplink grant, the UE proceeds to step 1020, in which the UE recognizes that an adaptive retransmission will be indicated through a downlink carrier having an HARQ feedback association with the uplink carrier, through which the uplink data has been transmitted, and monitors the downlink carrier during a predetermined time interval at a predetermined time point. After completing step 1015 or 1020, the UE proceeds to step 1025, in which the UE performs an uplink retransmission according to the prior art. Specifically, in step 1025, the UE performs an adaptive uplink retransmission when it has received an uplink grant indicating the uplink retransmission, or performs a non-adaptive uplink retransmission when it has not received an uplink grant indicating the uplink retransmission but has received a NACK as an HARQ feedback.

Meanwhile, if a rule that an uplink grant for an adaptive uplink retransmission should be always transmitted through a downlink carrier through which an HARQ feedback is transmitted has been arranged, a determination step like step 1010 is unnecessary and the operation of the UE is more simplified.

That is, as shown in FIG. 11, the UE transmits uplink data in step 1105, and then proceeds to step 1110. In step 1110, the UE selects a downlink carrier through which an HARQ feedback for the transmitted uplink data is transmitted, and monitors a PDCCH of the downlink carrier during a predetermined time interval at a predetermined time point. Then, in step 1115, the UE performs an uplink retransmission according to the prior art. Specifically, in step 1115, the UE performs an adaptive uplink retransmission when it has received an uplink grant indicating the uplink retransmission, or performs a non-adaptive uplink retransmission when it has not received an uplink grant indicating the uplink retransmission but has received a NACK as an HARQ feedback.

<3rd Embodiment>

When a UE using an LTE DRX scheme has received a scheduling command indicating an initial transmission, the UE starts an inactivity timer and operates a downlink carrier in an active time during the operation of the inactivity timer.

The present invention presents a method and an apparatus, in which, when a UE in which multiple downlink carriers and multiple uplink carriers are aggregated has received a scheduling command indicating an initial transmission, the UE operates only some pre-promised downlink carriers in an active time instead of operating all the aggregated downlink carriers in an active time, so that it is possible to minimize the battery consumption of the UE.

In the third embodiment of the present invention, the UE includes inactivity timers, the number of which is equal to the number of downlink carriers aggregated in the UE, wherein one inactivity timer corresponds to one downlink carrier one to one. Upon receiving a downlink assignment indicating an initial transmission of downlink data through a downlink carrier, the UE starts an inactivity timer for a downlink carrier, through which the downlink data is transmitted, and operates the downlink carrier in an active time during the operation of the inactivity timer, when the downlink carrier, through which the downlink assignment has been received, is equal to the downlink carrier, through which the downlink data is transmitted. In contrast, when the downlink carrier, through which the downlink assignment has been received, is different from the downlink carrier, through which the downlink data is transmitted, that is, when a cross scheduling between carriers occurs, the UE operates inactivity timers of all downlink carriers and operates all the downlink carriers in an active time. This is in order to increase the number of carriers, through which the UE can receive the scheduling, since the occurrence of a cross carrier scheduling implies that it is highly probable that the PDCCH capacity may be generally insufficient. Upon receiving an uplink assignment indicating an initial transmission, the UE starts an inactivity timer for a downlink carrier having an HARQ feedback association with an uplink carrier through which the uplink transmission will be performed, that is, an inactivity timer for a downlink carrier through which an HARQ feedback for the uplink transmission will be received, and operates the downlink carrier in an active time. As described above, a UE having transmitted uplink data monitors a predetermined downlink carrier in order to receive an HARQ feedback for the uplink data. Therefore, the UE operates the predetermined downlink carrier in an active time, because it is more efficient than operating another downlink carrier in an active time.

Figure 12:
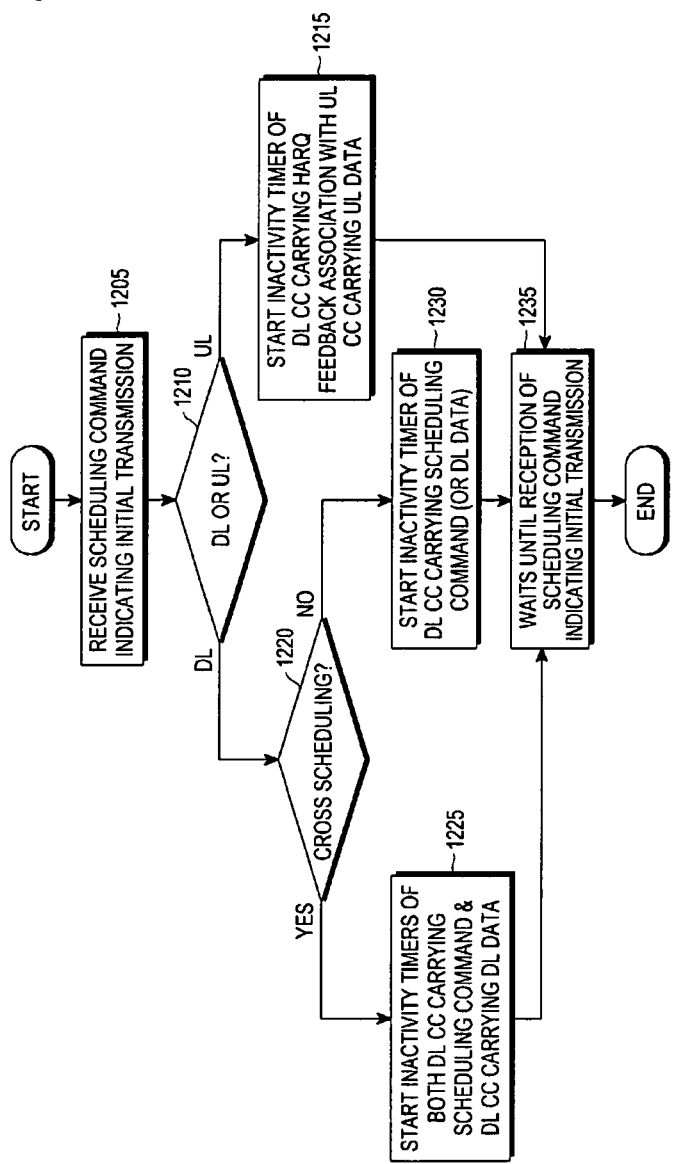
FIG. 12 illustrates an operation of a UE according to the third embodiment of the present invention.

FIG. 12 illustrates an operation of a UE according to the third embodiment of the present invention.

Referring to FIG. 12, upon receiving a scheduling command indicating an initial transmission in step 1205, the UE proceeds to step 1210, in which the UE determines if the scheduling command relates to a downlink reception or an uplink reception. That is, the UE determines if the received scheduling command is a downlink assignment or an uplink grant. As a result of the determination, the UE proceeds to step 1220 when the scheduling command is a downlink assignment and proceeds to step 1215 when the scheduling command is an uplink grant.

When the scheduling command is an uplink grant, the UE starts an inactivity timer of a downlink carrier having an HARQ feedback association with an uplink carrier through which the uplink transmission will be performed, that is, an inactivity timer of a downlink carrier through which an HARQ feedback for the uplink data transmission will be received, and operates the downlink carrier in an active time in step 1215. Then, in step 1235, the UE waits until a scheduling command indicating an initial transmission is received.

When the scheduling command is a downlink grant, the UE determines, in step 1220, if there is a cross association between carriers. That is, the UE determines if the downlink carrier, through which the downlink assignment has been received, is equal to the downlink carrier, through which the downlink data is received. Then, the UE proceeds to step 1230 when the two carriers are the same, and proceeds to step 1225 when the two carriers are not the same.

In step 1230, the UE starts an inactivity timer of the downlink carrier through which the scheduling command has been received, and operates the downlink carrier in an active time during the operation of the inactivity timer. Then, the UE proceeds to step 1235, in which the UE waits until a scheduling command indicating an initial transmission is received.

Meanwhile, in step 1225, the UE recognizes from the occurrence of the cross scheduling that the PDCCHs are insufficient, and increases the number of downlink carriers operated in an active time according to a predetermined rule. That is, the UE operates inactivity timers of both the downlink carrier, through which the scheduling command has been received, and the downlink carrier, through which the downlink data is received. Otherwise, the UE operates the inactivity timers of all the downlink carriers aggregated in the UE. Further, during the operation of the inactivity timers, the UE operates the corresponding downlink carriers in an active time. Thereafter, the UE proceeds to step 1235, in which the UE waits until a scheduling command indicating an initial transmission is received.

<4th Embodiment>

In order to perform a DRX operation, the UE includes a plurality of timers and determines whether to operate each carrier in an active time. This implies that the UE should operate a state machine for each carrier. Therefore, the larger the number of carriers aggregated in the UE, the larger the number of state machines, which may increase the complexity of the UE.

Therefore, the fourth embodiment of the present invention presents a method and an apparatus, which discriminates carriers, in which semi-permanent transmission resources causing frequent data transmission/reception have been configured, from carriers, in which semi-permanent transmission resources causing frequent data transmission/reception have not been configured, so as to discriminate the DRX operations of the carriers, in which semi-permanent transmission resources causing frequent data transmission/reception have been configured, from the DRX operations of the carriers, in which semi-permanent transmission resources causing frequent data transmission/reception have not been configured. As a result, a method and an apparatus according to the fourth embodiment of the present invention can limit the number of DRX state machines, which the UE must control, to only two.

Figure 13:
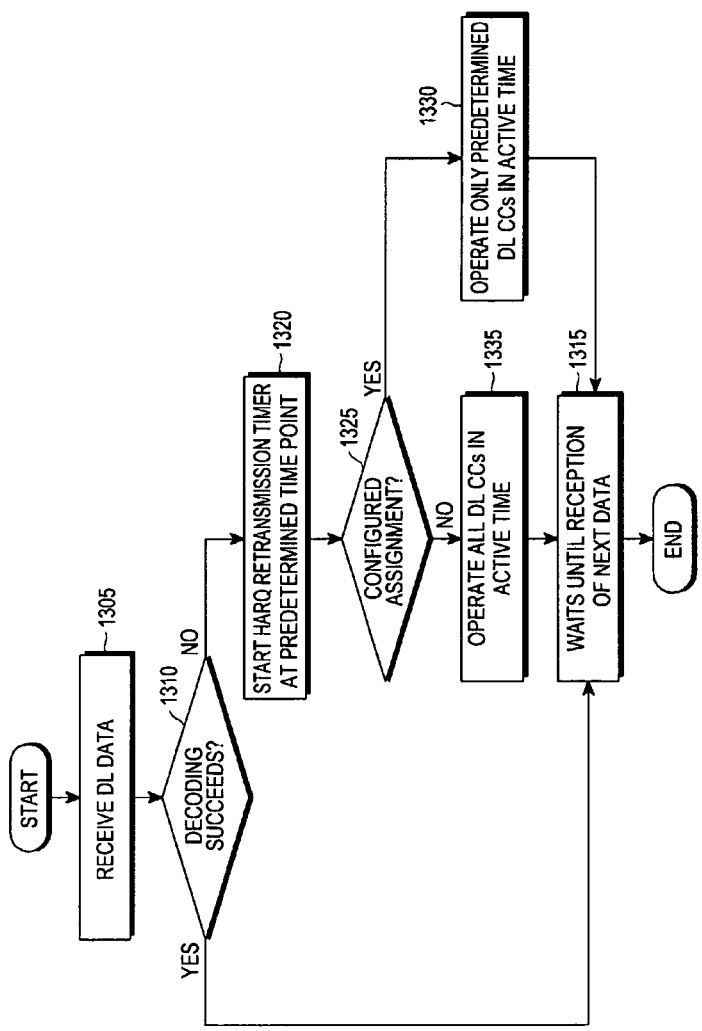
FIG. 13 is a flowchart illustrating an operation of a UE having received downlink data according to the fourth embodiment of the present invention.

FIG. 13 is a flowchart illustrating an operation of a UE having received downlink data according to the fourth embodiment of the present invention.

Referring to FIG. 13, in step 1305, the UE receives downlink data and decodes the received downlink data. Then, in step 1310, the UE determines if the decoding of the data is successful. When the decoding of the data is successful, the UE proceeds to step 1315, in which the UE waits until next downlink data is received. When the decoding of the data is not successful, the UE proceeds to step 1320 in order to receive HARQ retransmission data. In step 1320, the UE starts an HARQ retransmission timer at a time point after the passage of a predetermined time interval from the time point at which the downlink data is received. Further, the UE monitors a PDCCH of a predetermined downlink carrier in order to receive HARQ retransmission data during the operation of the HARQ retransmission timer. Then, the UE proceeds to step 1325 in order to determine the downlink carrier, a PDCCH of which the UE will examine. In step 1325, the UE determines if the downlink data having caused the operation of the HARQ retransmission timer has been received through a configured assignment. For this operation, the UE should memorize a downlink carrier, through which data having caused an operation of a particular HARQ retransmission timer has been received. In order to avoid memorization of a past state for the determination as described above, the UE may refer to the HARQ process to which the HARQ retransmission timer operated in step 1320 corresponds. Since the HARQ retransmission timer is configured for each HARQ process, if the HARQ process corresponding to the HARQ retransmission timer operated in step 1320 is an HARQ process configured for a semi-permanent transmission resource, it can be determined that the downlink data having caused the operation of the HARQ retransmission timer of step 1325 has been received through a configured assignment. When the downlink data having caused the operation of the HARQ retransmission timer has been received through a configured assignment, the UE proceeds to step 1330, in which the UE operates only a predetermined downlink carrier in an active time during the operation of the HARQ retransmission timer. This is because downlink data transmission and reception processes caused by aggregated downlink assignments do not largely degrade the degree of freedom of the scheduling even when they are completed within one downlink carrier. There may be various schemes employable in order to select one downlink carrier to be operated in an active time from multiple aggregated downlink carriers. The fourth embodiment of the present invention uses one scheme among a scheme of operating a downlink carrier, in which semi-permanent transmission resources have been aggregated, in an active time and a scheme of operating a downlink carrier, which has been predetermined through a call aggregation process, etc., in an active time.

In contrast, when the downlink data having caused the operation of the HARQ retransmission timer has not been received through a configured assignment, the UE proceeds to step 1335, in which the UE operates all the aggregated downlink carriers in an active time during the operation of the HARQ retransmission timer.

After performing step 1335 or 1330, the UE proceeds to step 1315, in which the UE waits until next downlink data is received.

Figure 14:
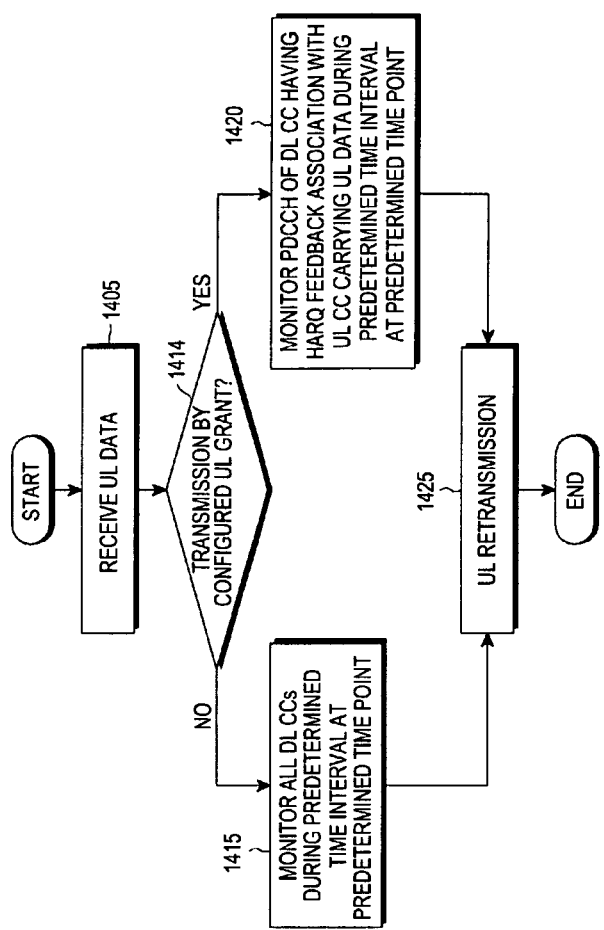
FIG. 14 is a flowchart illustrating an operation of a UE transmitting uplink data according to the fourth embodiment of the present invention.

FIG. 14 is a flowchart illustrating an operation of a UE transmitting uplink data according to the fourth embodiment of the present invention.

Referring to FIG. 14, the UE transmits uplink data in step 1405, and then determines if the uplink data transmission is a transmission by a configured uplink grant in step 1410. When the uplink data transmission is not a transmission by a configured uplink grant, that is, when the uplink data transmission is a transmission performed by receiving an uplink grant indicating an uplink transmission, the UE proceeds to step 1415, in which the UE operates all aggregated downlink carriers in an active time during a predetermined time interval at a predetermined time point in order to determine whether to perform an adaptive retransmission. In contrast, as a result of the determination in step 1410, when the uplink data transmission is a transmission by a configured uplink grant, the UE proceeds to step 1420, in which the UE recognizes that an adaptive retransmission will be indicated through a downlink carrier having an HARQ feedback association with the uplink carrier, through which the uplink data has been transmitted, and monitors the downlink carrier during a predetermined time interval at a predetermined time point. After completing step 1415 or 1420, the UE proceeds to step 1425, in which the UE performs an uplink retransmission according to the prior art.

<5th Embodiment>

Figure 16:
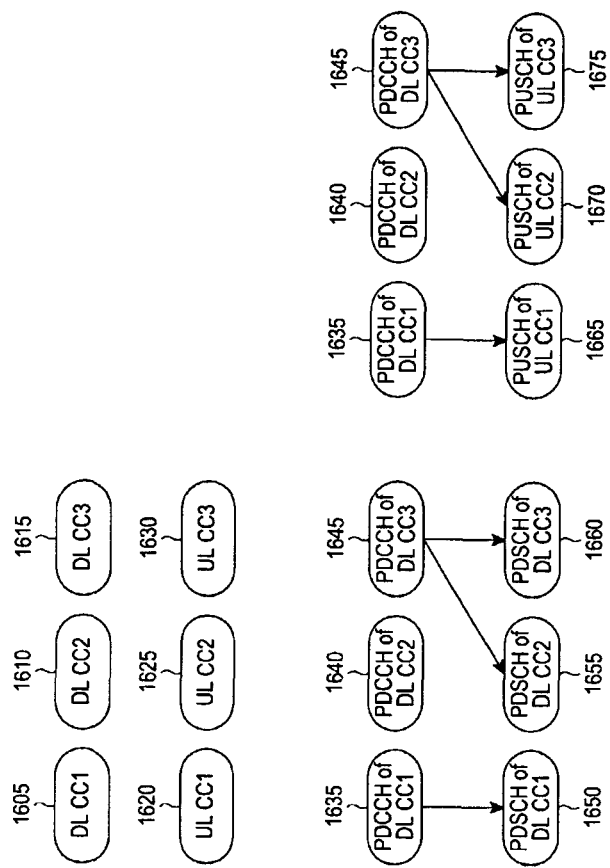
FIG. 16 illustrates carriers for a cross carrier scheduling according to the fifth embodiment of the present invention.

The cross scheduling between carriers is allowed only between predetermined carriers. For example, referring to FIG. 16, which illustrates carriers for a cross carrier scheduling according to the fifth embodiment of the present invention, when carriers including DL CC1 1605, DL CC2 1610, DL CC3 1615, UL CC1 1620, UL CC2 1625, and UL CC3 1630, have been aggregated in a UE, a PDSCH of a predetermined DL CC can be scheduled only through a PDCCH of a predetermined DL CC and a PUSCH of a predetermined UL CC can be scheduled only through a PDCCH of a predetermined DL CC. Further, based on one CC, a PDCCH or PUSCH of a single CC can be scheduled through a PDCCH of only one DL CC.

For example, a downlink assignment for a PDSCH 1650 of DL CC1 may be configured to be transmitted or received only through a PDCCH 1635 of DL CC1. Further, a PDSCH 1650 of DL CC2 may be configured to be scheduled only through a PDCCH 1645 of DL CC3 and a PDSCH 1660 of DL CC3 may be configured to be scheduled only through a PDCCH 1645 of DL CC3. The relation between the PDSCH and the PDCCH of the DL CCs can be applied to the uplink scheduling. For example, a downlink assignment for a PUSCH 1665 of UL CC1 may be configured to be transmitted or received only through a PDCCH 1635 of D CC1. Further, a PUSCH 1670 of UL CC2 may be configured to be scheduled only through a PDCCH 1645 of DL CC3 and a PUSCH 1675 of UL CC3 may be configured to be scheduled only through a PDCCH 1645 of DL CC3.

As described above, when a PDSCH of a predetermined DL CC is configured to be scheduled only through a PDCCH of a predetermined DL CC, it is defined that the PDSCH of a predetermined DL CC has an association with the PDCCH of a predetermined DL CC in view of downlink scheduling. The association between DL CCs is configured in the process of call setup.

When a PUSCH of a predetermined UL CC is configured to be scheduled only through a PDCCH of a predetermined DL CC, it is defined that the UL CC has an association with the DL CC in view of uplink scheduling. The association between the UL CC and the DL CC is configured in the process of call setup.

The fifth embodiment of the present invention presents a DRX operation of a UE when a PDSCH of a predetermined DL CC is associated with a PDCCH of a predetermined DL CC in view of downlink scheduling.

Figure 17:
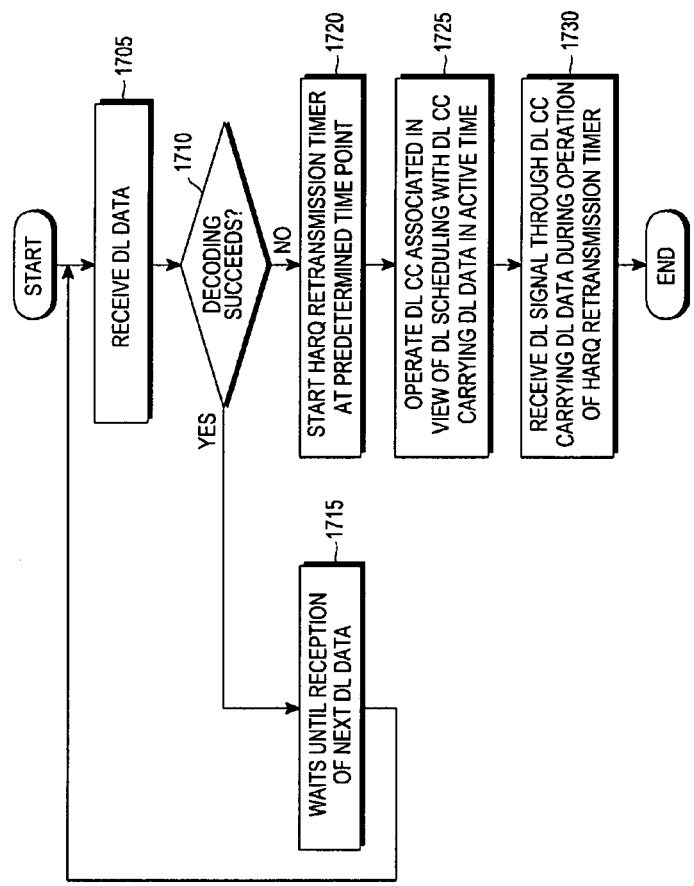
FIG. 17 is a flowchart illustrating an operation of a UE according to the fifth embodiment of the present invention.

FIG. 17 is a flowchart illustrating an operation of a UE according to the fifth embodiment of the present invention.

Referring to FIG. 17, in step 1705, the UE receives downlink data and decodes the received downlink data. Then, in step 1710, the UE determines if the decoding of the data is successful. When the decoding of the data is successful, the UE proceeds to step 1715, in which the UE waits until next downlink data is received. When the decoding of the data is not successful, the UE proceeds to step 1720 in order to receive HARQ retransmission data. In step 1720, the UE starts an HARQ retransmission timer at a time point after the passage of a predetermined time interval from the time point at which the downlink data is received. Further, the UE monitors a PDCCH of a predetermined downlink carrier in order to receive HARQ retransmission data during the operation of the HARQ retransmission timer. Then, the UE proceeds to step 1725 in order to determine the downlink carrier, a PDCCH of which the UE will examine. In step 1725, the UE operates a downlink carrier having an association in view of downlink scheduling with a downlink carrier, through which a PDSCH has been received, in an active time during the operation of the HARQ retransmission timer. The fact that a PDSCH of a predetermined downlink carrier has an association in view of downlink scheduling with a PDCCH of a predetermined downlink carrier implies that a downlink assignment for the PDSCH downlink carrier is transmitted and received only through the downlink carrier associated in view of downlink scheduling with the PDSCH downlink carrier. The association in view of downlink scheduling between downlink carriers is determined by an ENB and is reported to the UE through a call setup process, etc. If the downlink carrier, through which a PDSCH has been received, is different from the downlink carrier, through which a downlink assignment has been received, that is, when the PDSCH has been received through a cross carrier scheduling, the UE proceeds to step 1730, in which the UE keeps on receiving a downlink signal through the downlink carrier, through which the PDSCH has been received, as long as the HARQ retransmission timer is being operated. This is in preparation for a case in which the downlink assignment for the PDSCH downlink carrier is received through the downlink carrier associated in view of downlink scheduling with the PDSCH downlink carrier.

<6th Embodiment>

The sixth embodiment of the present invention presents a method of monitoring a downlink carrier associated in view of uplink scheduling with an uplink carrier, through which uplink transmission has been performed, in order to determine whether to perform an adaptive retransmission after the uplink transmission by a UE.

Figure 18:
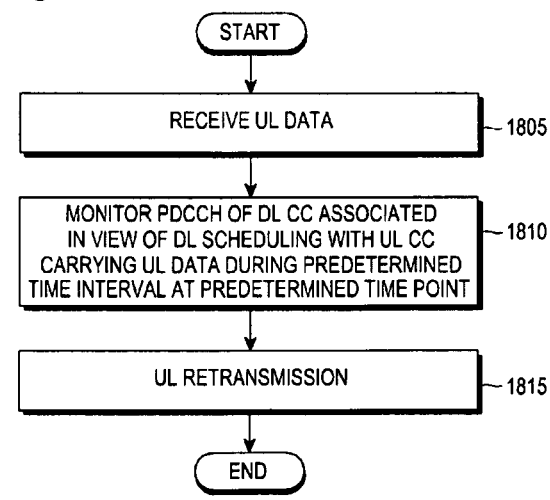
FIG. 18 is a flowchart illustrating an operation of a UE according to the sixth embodiment of the present invention.

FIG. 18 is a flowchart illustrating an operation of a UE according to the sixth embodiment of the present invention.

Referring to FIG. 18, in step 1805, the UE transmits uplink data. the uplink data transmission may be either a transmission by a configured uplink grant or a dynamically allocated uplink grant. In order to receive an HARQ feedback for the uplink transmission and determine if there is an adaptive retransmission command, the UE proceeds to step 1810. In step 1810, the UE identifies a downlink carrier associated in view of uplink scheduling with the uplink carrier, through which the uplink data has been transmitted. As described above, the fact that a predetermined uplink carrier has an association in view of uplink scheduling with a predetermined downlink carrier implies that an uplink grant for the uplink carrier is transmitted and received only through the downlink carrier associated in view of uplink scheduling with the uplink carrier. Further, an HARQ feedback for uplink data transmitted through the uplink carrier is also transmitted and received only through the downlink carrier associated in view of uplink scheduling with the uplink carrier. The association in view of uplink scheduling between the downlink carrier and the uplink carrier is determined by an ENB and is reported to the UE through a call setup process, etc.

The UE monitors a PDCCH of the downlink carrier associated in view of uplink scheduling with the uplink carrier, through which the uplink transmission has been performed, during a predetermined time interval at a predetermined time point, or operates the downlink carrier in an active time during a predetermined time interval at a predetermined time point. The predetermined time point corresponds to a time point after the passage of a predetermined time interval from the time point at which the uplink data has been transmitted. The UE may selectively perform the operations described above according to the state of an HARQ buffer storing the uplink data. For example, after the transmission of the uplink data in step 1805, if the HARQ buffer storing the uplink data is flushed, there will not be an HARQ retransmission for the uplink data any more. Therefore, the UE can directly proceed to step 1815 without performing step 1810. That is, after transmitting the uplink data in step 1805, the UE performs step 1810 only when the HARQ buffer storing the uplink data is not flushed. Then, in step 1815, the UE performs an uplink retransmission process according to the prior art. That is, in step 1815, the UE performs an adaptive uplink retransmission when it has received an uplink grant indicating the uplink retransmission, or performs a non-adaptive uplink retransmission when it has not received an uplink grant indicating the uplink retransmission but has received a NACK as an HARQ feedback.

In step 1810, the uplink carrier, through which the uplink data has been transmitted, has the same meaning as an uplink carrier, to which an HARQ process having transmitted the uplink data belongs. In other words, step 1810 can be expressed as a step of "identifying a downlink carrier associated in view of uplink scheduling with the uplink carrier, to which an HARQ process having transmitted the uplink data belongs". When multiple carriers have been aggregated, multiple HARQ processes are configured for each carrier and one HARQ process receives data from only one carrier or transmits data through only one carrier. Then, the HARQ process processing data of a particular carrier as above is expressed as "belonging to the carrier".

<7th Embodiment>

The seventh embodiment of the present invention presents a method of determining a downlink carrier to be monitored based on an HARQ process associated with an HARQ retransmission timer during an operation of the HARQ retransmission timer.

An HARQ retransmission timer is defined for each HARQ process. That is, the HARQ retransmission timer is a timer for receiving an HARQ retransmission for a related HARQ process. Further, one downlink HARQ process can receive data from only one downlink carrier. In other words, since a retransmission for the HARQ process is also received from the predetermined downlink carrier, if an HARQ retransmission timer for a predetermined HARQ process is being operated, it is preferable to process the retransmission for the HARQ process by monitoring a PDCCH of the downlink carrier, through which the retransmission for the HARQ process will be received. If a PDCCH has not been configured for the downlink carrier, a PDCCH of a downlink carrier associated in view of downlink scheduling with the downlink carrier having no configured PDCCH is monitored. When multiple downlink carriers are configured in one ENB and some of the downlink carriers are mixedly distributed in a pico cell and a general cell belonging to the ENB, the ENB may not transmit PDCCHs of the carriers. This is because the pico cell may be unable to perform a normal communication due to a strong inter-cell interference from the general cell, a transmission power of which is much stronger than a transmission power of the pico cell. Although the inter-cell interference can be reduced or prevented through the separate use of transmission resources between a general ENB and the pico cell in the case of the PDSCH, it is impossible to separate the transmission resources in the case of the PDCCH. Therefore, it is usual that the general ENB does not transmit a PDCCH in order to reduce the influence on the PDCCH of the pico cell. As described above, a PDCCH may not be configured in some carriers among a plurality of carriers, and downlink assignments for the carriers having no configured PDCCH are transmitted through a PDCCH of another predetermined downlink carrier. The downlink carrier for transmitting and receiving downlink assignments for the carriers having no configured PDCCH is called a downlink carrier associated in view of downlink scheduling with the carriers having no configured PDCCH.

Figure 19:
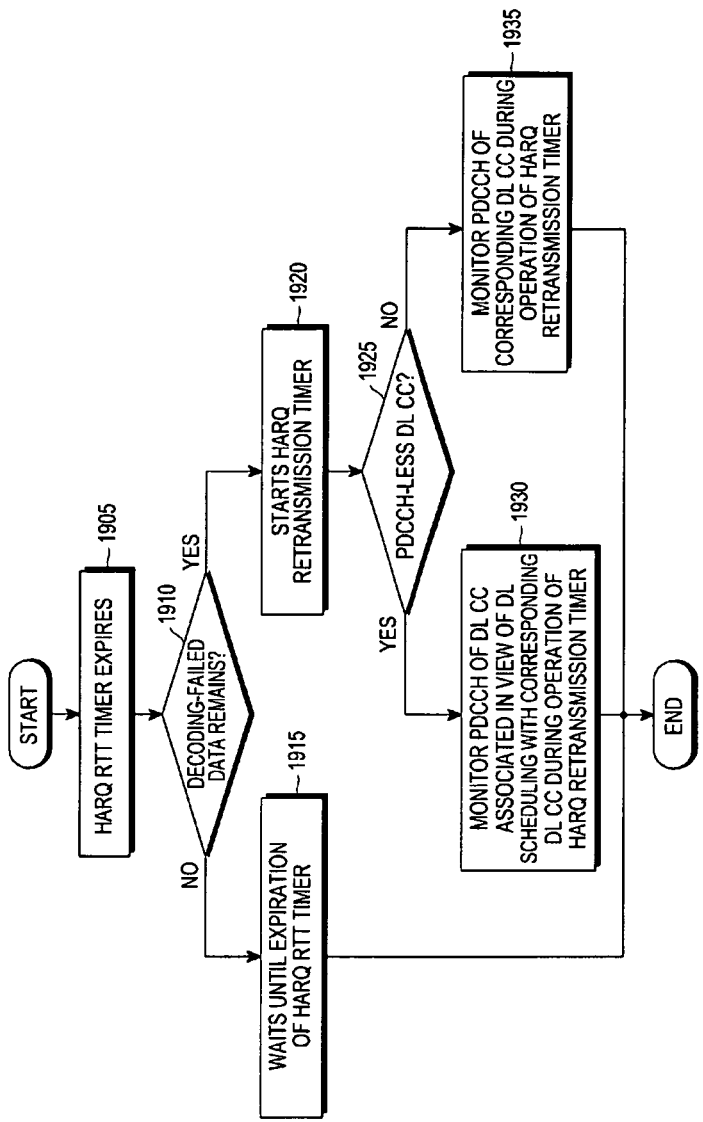
FIG. 19 is a flowchart illustrating an operation of a UE according to the seventh embodiment of the present invention.

FIG. 19 is a flowchart illustrating an operation of a UE according to the seventh embodiment of the present invention.

Referring to FIG. 19, an HARQ RTT timer for a predetermined HARQ process of a predetermined downlink carrier expires in step 1905, and the UE determines if an HARQ process of the expired HARQ RTT timer stores data, decoding of which had failed, in step 1910. The HARQ RTT timer is a timer for controlling a starting time point of an HARQ retransmission timer, and is started to be operated at a time point at which data is received in a predetermined HARQ process, which is described in detail in Section 5.7 of 3GPP Technical Specification 36.321.

As a result of the determination in step 1910, when an HARQ process of the expired HARQ RTT timer does not store data, decoding of which had failed, it implies that retransmission for the corresponding HARQ process is unnecessary, and the UE proceeds to step 1915, in which the UE waits until another HARQ RTT timer expires. In contrast, when an HARQ process of the expired HARQ RTT timer stores data, decoding of which had failed, it implies that retransmission for the corresponding HARQ process is necessary, and the UE proceeds to step 1920. In step 1920, the UE starts an HARQ retransmission timer corresponding to the HARQ process.

Further, in step 1925, the UE determines if a PDCCH has been configured in a downlink carrier, to which an HARQ process corresponding to the started HARQ retransmission timer belongs. As a result of the determination in step 1925, when a PDCCH has been configured in the downlink carrier, the UE proceeds to step 1930, in which the UE monitors a PDCCH of a downlink carrier associated in view of downlink scheduling with the downlink carrier having the configured PDCCH during the operation of the HARQ retransmission timer. At this time, it goes without saying that the UE should also receive a downlink carrier, to which the HARQ process belongs. In contrast, as a result of the determination in step 1925, when the downlink carrier, to which an HARQ process corresponding to the started HARQ retransmission timer belongs, is the downlink carrier in which the PDCCH has been configured, the UE proceeds to step 1935, in which the UE monitors a PDCCH of the downlink carrier during the operation of the HARQ retransmission timer.

In the above description, the fact that a PDCCH has not been configured in a downlink carrier implies that an ENB has configured that a UE should not receive a PDCCH of the downlink carrier. An ENB determines whether to configure a PDCCH for a downlink carrier, and a downlink carrier, which will be associated in view of downlink scheduling with another downlink carrier having no configured PDCCH, and then reports the determination to a UE through a call setup process or another control process.

Figure 15:
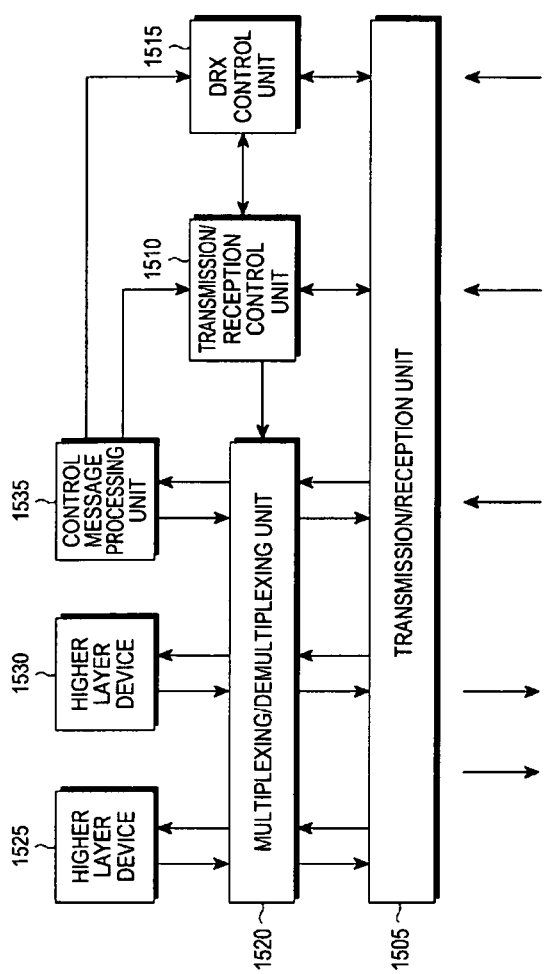
FIG. 15 is a block diagram illustrating a structure of a UE for the first to seventh embodiments of the present invention.

FIG. 15 is a block diagram illustrating a structure of a UE for the first to seventh embodiments of the present invention.

A UE according to an embodiment of the present invention includes a transmission/reception unit 1505, a DRX control unit 1515, a transmission/reception control unit 1510, a multiplexing/demultiplexing unit 1520, a control message processing unit 1535, and various higher layer devices 1525 and 1530.

The transmission/reception unit 1505 receives data and predetermined control signals through a downlink carrier and transmits data and predetermined control signals through an uplink carrier. When multiple carriers have been aggregated, the transmission/reception unit 1505 performs transmission and reception of data and predetermined control signals through the multiple carriers.

The transmission/reception control unit 1510 controls the transmission/reception unit 1505 to make the transmission/reception unit 1505 transmit uplink data or receive downlink data according to a control signal (e.g. a scheduling command) provided by the transmission/reception unit 1505. Further, when receiving the scheduling command, the transmission/reception control unit 1510 notifies the DRX control unit 1515 of the carrier, from which the scheduling command is received, and the carrier, which the scheduling command relates to.

The DRX control unit 1515 operates an on-duration timer, an inactivity timer, and an HARQ retransmission timer, determines the downlink carrier to be operated in an active time during an operation of each timer based on a scheduling command transferred from the transmission/reception control unit 1510, and controls the transmission/reception unit 1505 to turn on a transmission/reception device for a carrier operating in an active time while turning off a transmission/ reception device for a carrier operating in a non-active time. The length of each of the timers is determined based on information transferred by the control message processing unit 1535.

The multiplexing/demultiplexing unit 1520 multiplexes data generated in the control message processing unit 1535 or the higher layer devices 1525 and 1530, or demultiplexer data received from the transmission/reception unit 1505 and transfers the demultiplexed data to the control message processing unit 1535 or a proper higher layer device 1525 or 1530.

The control message processing unit 1535 processes a control message transmitted from a network and then performs a necessary operation. For example, the control message processing unit 1535 transfers DRX-related timer values included in a control message to the DRX control unit 1515.

The higher layer device 1525 or 1530 may be configured for each service, and processes data occurring in a user service, such as File Transfer Protocol (FTP) or Voice over Internet Protocol (VoIP), and transfers the processed data to a multiplexing unit, or processes data transferred from the demultiplexing unit 1520 and transfers the processed data to a service application of a higher layer.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of discontinuous data reception by a User Equipment (UE), in which multiple carriers are aggregated, in a mobile communication system, the method comprising:
    receiving scheduling information related to downlink data in a first downlink carrier among a plurality of downlink carriers;
    receiving the downlink data in a second downlink carrier among the plurality of downlink carriers;
    decoding the received downlink data;
    if the decoding is failed,
        operating a retransmission timer for receiving retransmitted downlink data;
        if the first downlink carrier is different from the second downlink carrier, monitoring both of the first downlink carrier and the second downlink carrier for receiving the retransmitted downlink data during an operation of the retransmission timer; and
        if the first downlink carrier is identical to the second downlink carrier, monitoring the first downlink carrier for receiving the retransmitted downlink data during the operation of the retransmission timer.

2. The method of claim 1, wherein the receiving of the scheduling information comprises:
    operating an on-duration timer for monitoring the plurality of downlink carriers; and
    if the scheduling information is received before the on-duration timer expires, operating an inactivation timer to extend an operation time of the on-duration timer.

3. The method of claim 1, wherein, if the downlink data is received in the plurality of downlink carriers, all of the plurality of downlink carriers are monitored during the operation of the retransmission timer.

4. The method of claim 1, further comprising:
    if the operation of the retransmission timer expires, performing a deactivating operation for deactivation of a reception operation.

5. The method of claim 1, further comprising:
    transmitting uplink data;

if the uplink data is transmitted in a first uplink carrier indicated by the scheduling information, monitoring a third downlink carrier in a feedback association with the first uplink carrier; and retransmitting the uplink data in the first uplink carrier based on a monitoring result of the third downlink carrier.

6. The method of claim 5, wherein the retransmitting of the uplink data comprises retransmitting the uplink data if a Negative Acknowledgment (NACK) is received in the third downlink carrier as a downlink feedback to the uplink data.

7. The method of claim 5, wherein, if the uplink data is transmitted in a second uplink carrier, and the second uplink carrier is different from the first uplink carrier indicated by the scheduling information, monitoring the plurality of downlink carriers.

8. A User Equipment (UE) in a mobile communication system, the UE comprising:
a transceiver configured to receive scheduling information related to downlink data in a first downlink carrier among a plurality of downlink carriers, receive the downlink data in a second downlink carrier among the plurality of downlink carriers; and
a controller configured to:
decode the received downlink data;
if the decoding is failed:
operate a retransmission timer for receiving retransmitted downlink data;
if the first downlink carrier is different from the second downlink carrier, monitor both of the first downlink carrier and the second downlink carrier for receiving the retransmitted downlink data during an operation of the retransmission timer; and
if the first downlink carrier is identical to the second downlink carrier, monitor the first downlink carrier for receiving the retransmitted downlink data during the operation of the retransmission timer.

9. The UE of claim 8, wherein the controller is configured to operate an on-duration timer for monitoring the plurality of downlink carriers, and if the scheduling information is received before the on-duration timer expires, operate an inactivation timer to extend an operation time of the on-duration timer.

10. The UE of claim 8, wherein, if the downlink data is received in the plurality of downlink carriers, all of the plurality of downlink carriers are monitored during the operation of the retransmission timer.

11. The UE of claim 8, wherein, if the operation of the retransmission timer expires, the controller is configured to perform a deactivating operation for deactivation of a reception operation.

12. The UE of claim 8, wherein the controller is configured to control the transceiver to transmit uplink data, if the uplink data is transmitted in a first uplink carrier indicated by the scheduling information; monitor a third downlink carrier having a feedback association with the first uplink carrier; and control the transceiver to transmit the uplink data in the first uplink carrier based on a monitoring result of the third downlink carrier.

13. The UE of claim 12, wherein, if the uplink data is transmitted in a second uplink carrier, and the second uplink carrier is different from the first uplink carrier indicated by the scheduling information, the controller is configured to monitor the plurality of downlink carriers.

14. The UE of claim 8, wherein the controller is configured to control the transceiver to retransmit the uplink data if a Negative Acknowledgment (NACK) is received in the third downlink carrier as a downlink feedback to the uplink data.

* * * * *